ANDREW J. BAITY, OF XENIA, ILLINOIS.

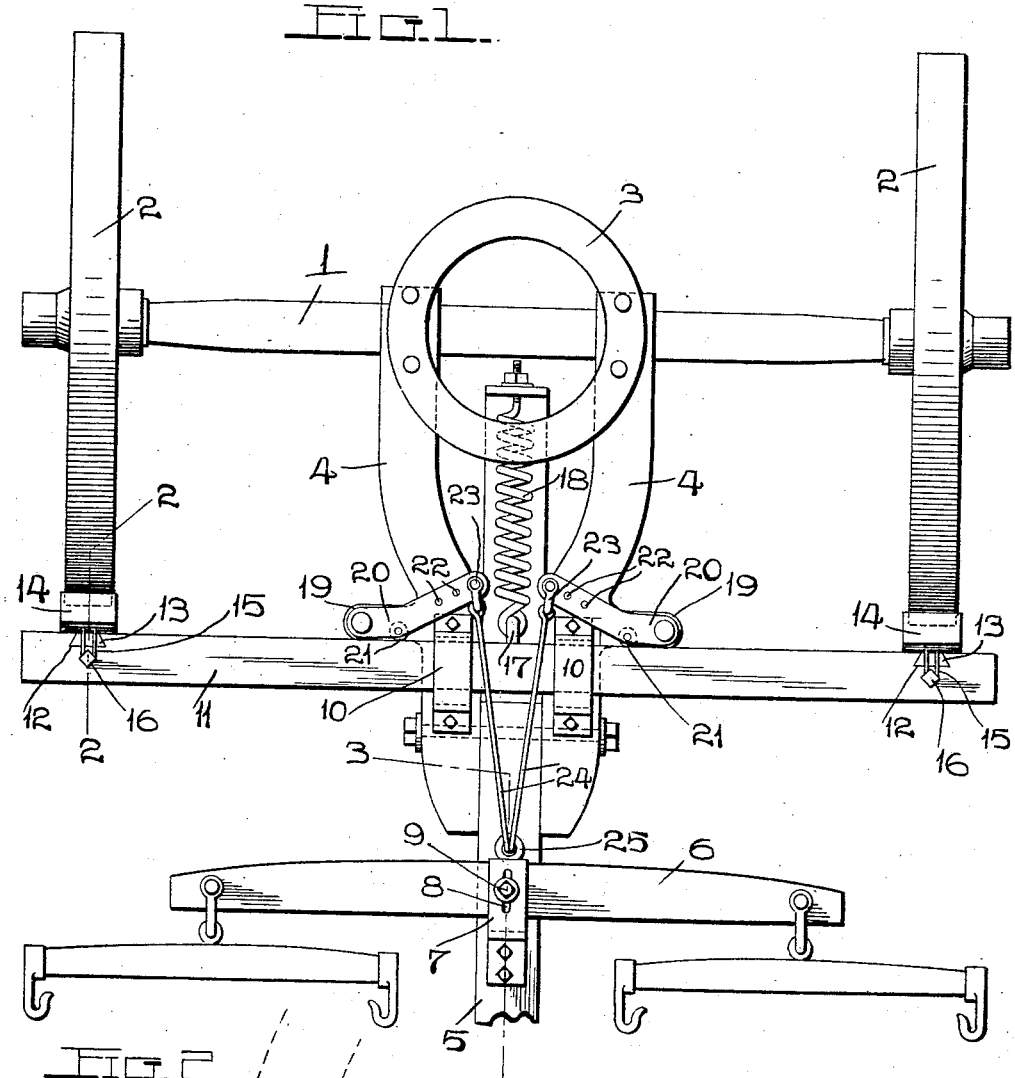

VEHICLE-BRAKE.

No. 864,060.

Specification of Letters Patent.

Patented Aug. 20, 1907.

Application filed March 5, 1907. Serial No. 360,796.

*To all whom it may concern:*

Be it known that I, ANDREW J. BAITY, a citizen of the United States, and a resident of Xenia, Illinois, have invented certain new and useful Improvements in Vehicle-Brakes, of which the following is a specification containing a full, clear, and exact description, reference being had to the accompanying drawings, forming a part hereof.

My invention relates to a vehicle brake, and has for its object the arrangement of a simple, inexpensive brake which may be applied to the wheels of vehicles, and the brake shoes of which brake are normally caused to contact with the treads of the wheels with yielding pressure, and which shoes are withdrawn from the wheels by the forward pull of the draft animals attached to the vehicle.

While my improved brake is primarily intended for use on wagons and buggies, it will readily be understood that, with slight changes, it may be applied to all forms of cars.

To the above purposes, my invention consists of certain novel features of construction and arrangement of parts, which will be hereinafter more fully set forth, pointed out in the claims, and illustrated in the accompanying drawings, in which:—

Figure 1 is a plan view of the front wheels and forward portion of the running gear of a wagon, and showing my improved brake applied thereto; Fig. 2 is a vertical section taken on the line 2—2 of Fig. 1; Fig. 3 is an enlarged vertical section taken on the line 3—3 of Fig. 1.

Referring by numerals to the accompanying drawings:—

1 designates the front axle of the vehicle, 2 the front wheels thereof, 3 the turn table, 4 the hounds, 5 the tongue, which is connected to the hounds in the usual manner, and 6 the double tree.

7 designates the clip which is fixed to the tongue and extends over the double tree, and formed in said clip is a longitudinally extending slot 8, through which passes a bolt 9, which is seated in said double tree, which arrangement provides for a short backward and forward movement of double tree relative the tongue.

Fixed on the forward portions of the hounds 4 are loops 10, through which passes the transversely arranged brake beam 11, the ends of which project in front of the forward portions of the wheels 2; and formed in the rear side of said brake beam, adjacent its ends, are the vertically disposed dove-tailed slots 12, which are normally occupied by the dove tailed ribs 13 formed integral with the rear sides of brake shoes 14, which contact with the treads of the wheels 2.

Fixed in the upper portion of each brake shoe is a horizontally disposed staple 15, which engages a bolt 16 seated in the end of the brake beam 11, which arrangement prevents the dislodgment of the brake shoe when said shoes are elevated by a reverse motion of the wheels due to backing the vehicle.

Fixed to the rear side of the center of the brake beam 11 is an eye 17, to which is secured the forward end of a heavy retractile coil spring 18, the rear end thereof being secured in any suitable manner to a fixed portion of the hounds 4, and said coil spring normally pulls the brake beam 11 rearwardly and causes the brake shoes 14 to bear on the treads of the vehicle wheels.

Extending outwardly from the sides of the hounds 4 are brackets 19, and pivotally connected thereto are the outer ends of a pair of levers 20, which carry on their forward sides anti-friction rollers 21 which bear on the rear face of the brake beam 11.

Each lever 20 is provided with a series of apertures 22, and arranged to be adjustably connected on said levers are loops or clevises 23, to which are connected the rear ends of a pair of forwardly extending rods 24, the forward ends of which latter are connected to a ring 25 fixed to the rear side and center of the double tree 6.

When my improved brake is in use, and the vehicle is standing still or moving down grade so that the pull of the draft animals is not required, the spring 18 pulls the brake beam 11 rearwardly, therefore causing the brake shoes 14 to frictionally engage the tread of the wheels, and consequently prevent or tend to prevent the rotation of said wheels. When the vehicle is started, the pull of the draft animals on the double tree 6 draws the same forward, in turn pulling upon the rods 24, which actuates the levers 20, causing the anti-friction rollers to bear against the rear side of the brake beam 11, and forcing the same forward underneath the loops 10 until the front side of said brake beam bears against the forward ends of said loops; and the vehicle will now be pulled forward, with the brake shoes removed from the treads of the wheels. Thus, the pull of the draft animals is used for withdrawing the brake shoes from the wheels, and as soon as the vehicle stops or starts down an incline, the shoes are immediately applied through the action of the spring 18. When the vehicle is backed, the reverse movement of the wheels 2 elevates the brake shoes, and there will be no gripping action of said shoes upon the treads of said wheels; and the staples 15 engaging the bolts 16 prevent withdrawal, and prevent said shoes from becoming detached from the brake beam.

In some instances, it may be found desirable to arrange an expansive coil spring on the front side of the brake beam to push the same rearwardly; and in some instances the entire appliance can be applied to the rear wheels of the vehicle instead of the front wheels.

A brake of my improved construction is easily applied to all forms of vehicles or cars, is automatic in its operation, and the brake shoes are always applied to the wheels while the vehicle is not in motion or moving down an incline.

I claim:—

1. The combination with a vehicle and the hounds thereon, of a pair of loops arranged on the hounds, a brake beam passing through said loops and arranged to move backward and forward therein, a retractile coil spring fixed to the center of the brake beam and normally exerting a rearward pull on the same, vertically movable brake shoes arranged on the ends of the brake beam and adapted to engage the peripheries of the vehicle wheels, a pair of levers fulcrumed to the hounds, antifriction rollers carried by the levers for engaging the rear side of the brake beam, and connections between the free ends of the levers and the vehicle doubletree.

2. The combination with a vehicle and its hounds, of a clip fixed to the vehicle tongue in which is formed a slot, a doubletree arranged beneath the clip, a bolt passing through the slot in the clip and seated in the doubletree, a pair of loops arranged on the hounds, a brake beam passing through said loops and movable therein, brake shoes arranged for vertical movement on the ends of the brake beam, which shoes are adapted to engage the peripheries of the vehicle wheels, a pair of bent levers fulcrumed on the hounds, and which levers are adapted to engage against the rear side of the brake beam, and rods adjustably connected to the levers at their rear ends and being connected at their forward ends to the doubletree.

In testimony whereof, I have signed my name to this specification, in presence of two subscribing witnesses.

ANDREW J. BAITY.

Witnesses:
W. S. COLCLASURE,
G. H. BAITY.